United States Patent [19]

Morimoto et al.

[11] Patent Number: 4,692,019

[45] Date of Patent: Sep. 8, 1987

[54] DOCUMENT SIZE DETECTING DEVICE

[75] Inventors: Kiyoshi Morimoto, Osaka; Masuo Kawamoto, Daito; Hiroshi Kobayashi, Kobe; Masahiro Hashizume, Yao; Hideaki Tsudaka, Neyagawa; Hiroshi Kimura, Habikino, all of Japan

[73] Assignee: Mita Industrial Co., Ltd., Osaka, Japan

[21] Appl. No.: 880,859

[22] Filed: Jul. 1, 1986

[30] Foreign Application Priority Data

Jul. 5, 1985 [JP] Japan ................................ 60-148780

[51] Int. Cl.4 ...................... G03G 15/04; G03B 27/62

[52] U.S. Cl. .................................. 355/8; 355/14 SH; 355/75

[58] Field of Search .................... 355/3 SH, 8, 14 SH, 355/75; 250/560

[56] References Cited

U.S. PATENT DOCUMENTS

| | | | |
|---|---|---|---|
| 4,320,961 | 3/1982 | Davis et al. | 355/14 |
| 4,456,372 | 6/1984 | Yamauchi | 355/14 SH X |
| 4,568,181 | 2/1986 | Nishiyama | 355/14 SH X |

FOREIGN PATENT DOCUMENTS

| | | | |
|---|---|---|---|
| 1786558 | 2/1967 | Fed. Rep. of Germany . | |
| 60-10237 | 1/1985 | Japan | 355/75 |
| 60-14229 | 1/1985 | Japan | 355/75 |
| 1326038 | 8/1973 | United Kingdom . | |
| 1542434 | 3/1979 | United Kingdom . | |

*Primary Examiner*—Arthur T. Grimley

*Assistant Examiner*—J. Pendegrass

*Attorney, Agent, or Firm*—Beveridge, DeGrandi & Weilacher

[57] ABSTRACT

A document size detecting device according to the invention is adapted to be mounted in an image forming device for a copying machine or the like, comprising an arm adapted to be folded and unfolded in operative association with the forward and backward movements, respectively, of the optical section of the image forming device, and a plurality of optical sensors attached to the arm at predetermined positions thereon corresponding to various format sizes of documents.

3 Claims, 10 Drawing Figures

DOCUMENT SIZE DETECTING DEVICE

BACKGROUND OF THE INVENTION

The present invention relates to a document size detecting device, more particularly, relates to a document size detecting device for automatically detecting a size of a document set on a contact glass.

In recent years, there has been proposed an image forming device for a copying machine or the like having an automatic paper feeding function for detecting a document size and automatically feeding from a cassette a paper sheet of the size corresponding to a preset copy magnification factor, and an automatic magnification factor setting function for automatically computing the copy magnification factor from the detected document size and paper sheet size to perform a magnification changing operation of an optical system.

Among known document size detecting devices for use in such type of image forming device are:

(1) A device wherein a sensor bar having a sensor at its front end is revolved parallel to a surface of the contact glass sheet in operative association with the action of closing the document holder, whereby the size of the document is automatically detected on the basis of the time needed until the document is detected (see Japanese Utility Model Application Laid-Open No. 201558/1982);

(2) A device comprising a colored member installed at a predetermined position on the document holder, a light emitter for radiating light to the colored member, a light receiver for receiving the reflected light from the colored member, and drive means for retracting the light receiver to a position not interfering with the movement of the document before the copying operation is performed, wherein the size of the document is automatically detected on the basis of signals from the light receiver corresponding to the portions obstructed and non-obstructed by the document, respectively (see Japanese Patent Application Laid-Open No. 22424/1981); and (3) A device including a pair of optical sensors attached to a movable frame at predetermined positions thereon which supports the optical section, wherein one of said optical sensors detects the end of a document while the other optical sensor reads a mark on an indicator plate, whereby the size of the document is automatically detected (see Japanese Patent Application Laid-Open No. 48759/1982).

However, the document size detecting device (1) poses a problem that when the speed changes at which the document holder is closed, the document detecting time changes, resulting in erroneously detecting the size of the document.

Further, the document size detecting device (2) requires a special driving mechanism for retracting the light receiver, thus complicating the arrangement of the device. Furthermore, a period of time for retracting the light receiver is needed from completing the detection of the document size till starting the exposure of the document, so that there is a problem that the time is prolonged which is needed after keying operation for starting exposure of the document till completion of exposure of the document.

Every time the above-mentioned document size detecting device (3) senses the document size, the movable frame supporting the optical unit must be reciprocated once. Therefore, there is a disadvantage that the time after key-input for starting exposure of the document till completion of exposure is prolonged.

SUMMARY OF THE INVENTION

An object of the invention is to provide a document size detecting device which is not influenced by changes of the speed for closing the document holder and is capable of reducing the time needed after predetermined keying is effected till exposure of the document is completed.

A document size detecting device to achieve the aforesaid object according to the invention comprises an arm foldable at a predetermined portion thereof, and a plurality of optical sensors attached to the upper surface of the arm so that they correspond to documents of various format sizes.

The arm can be folded and unfolded in operative association with the movement of the optical system, by being connected at one end thereof to the body of the image forming device at a predetermined position thereon and at the other end thereof to a movable frame at a predetermined position thereon which supports the optical section.

However, the arm may be removably attached to the movable frame, and the optical sensors may be of the reflecting type and attached to the arm so that they are directed obliquely upward.

According to the document size detecting device arranged in the manner described above, with the movable frame supporting the optical section being in a home position and with the arm being substantially unfolded, the optical sensors can be disposed so that they correspond to documents of various format sizes; therefore, by deciding which optical sensor is detecting the document, it is possible to automatically detect the size of the document. And upon detection of the size of the document, the arm is folded following the movement of the movable frame, so that exposure of the document can be performed without any trouble.

Further, in the case where the arm is removably connected to the movable frame, it is possible to move the arm and the movable frame in one piece at the first exposure time and move the movable frame alone at the second and following exposure times.

If the optical sensors are of the reflecting type and attached to the arm so that they are directed obliquely upward, it is possible to accurately detect the size of the document without being influenced by the reflected light from the contact glass sheet.

The above and the other objects will become apparent from the description hereinafter with reference to the accompanying drawings.

DETAILED DESCRIPTION OF THE PREFERRED EMBODIMENTS

Figure 1:
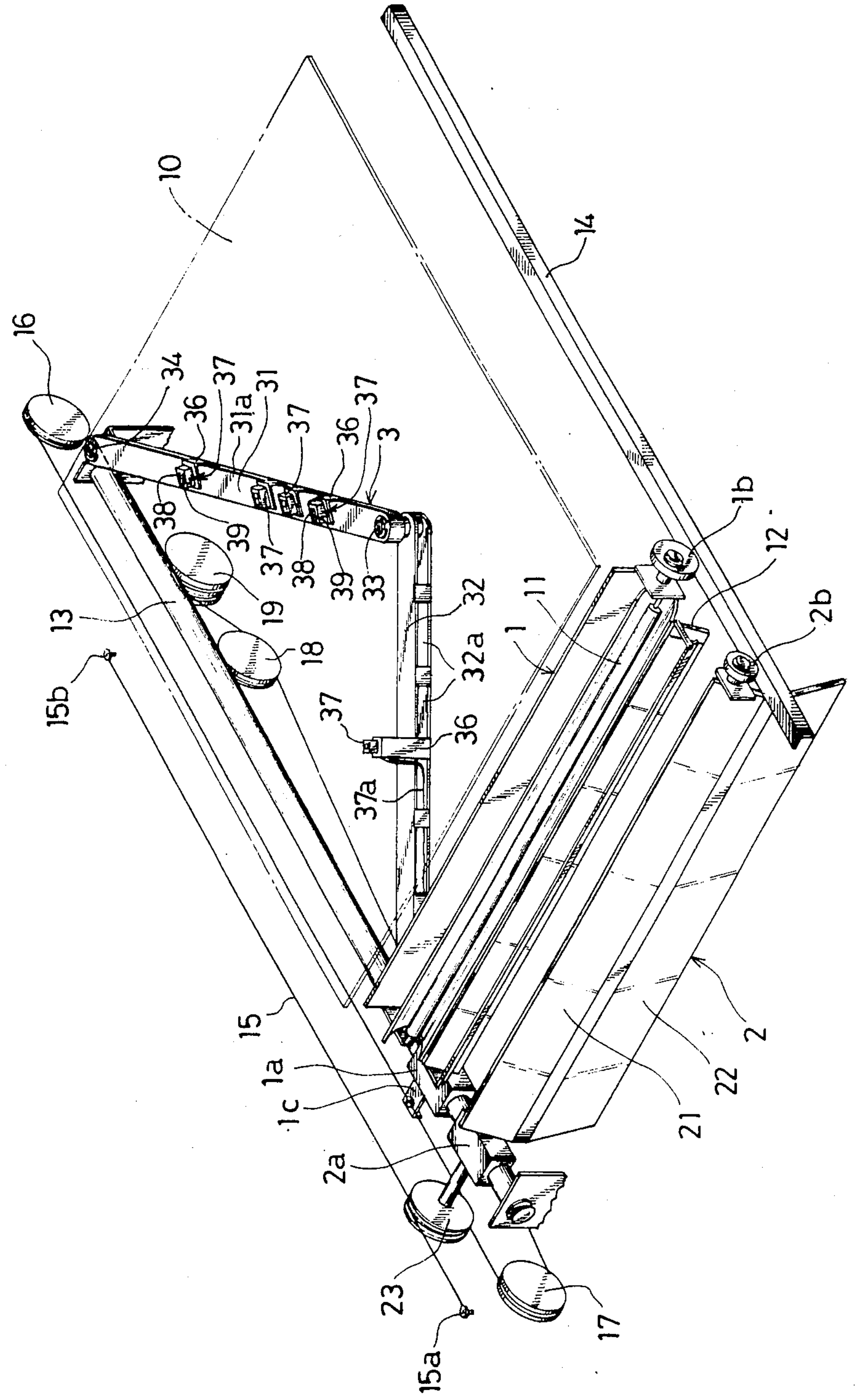
FIG. 1 is a perspective view of a document size detecting device according to an embodiment of the invention.

FIG. 1 is a perspective view showing a document size detecting device of the present invention installed in a copying machine.

In FIG. 1, the numeral 1 denotes a first movable frame for a copying machine; 2 denotes a second movable frame; and 3 denotes an arm.

The first movable frame 1 serves to support a light source 11 and a reflecting mirror 12. The second movable frame 2 serves to support reflecting mirrors 21 and 22. The movable frames 1 and 2 are slidably engaged at one of their respective ends with a guide shaft 13 through slide members 1*a* and 2*a*. The other ends of the movable frames are placed on a guide rail 14 disposed in parallel relationship to the guide shaft 13 through rotatable rollers 1*b* and 2*b*. Thus, the two movable frames 1 and 2 are reciprocative along the guide shaft 13 and guide rail 14.

The optical section comprising the above-mentioned light source 11 and reflecting mirrors 12, 21 and 22 is made reciprocative by winding a wire 15, fixed at its opposite ends 15*a* and 15*b* to the body of the copying machine, around pulleys 16 and 17, a tension pulley 18 and a driving drum 19, and also around a driven pulley 23 attached to the second movable frame 2 at a predetermined position thereon, and fixing the wire 15 to a projecting strip 1*c* extending from the slide member 1*a*. Thus, when the two movable frames 1 and 2 are moved, the moving speed of the first movable frame 1 is twice that of the second movable frame 2.

Figure 3:
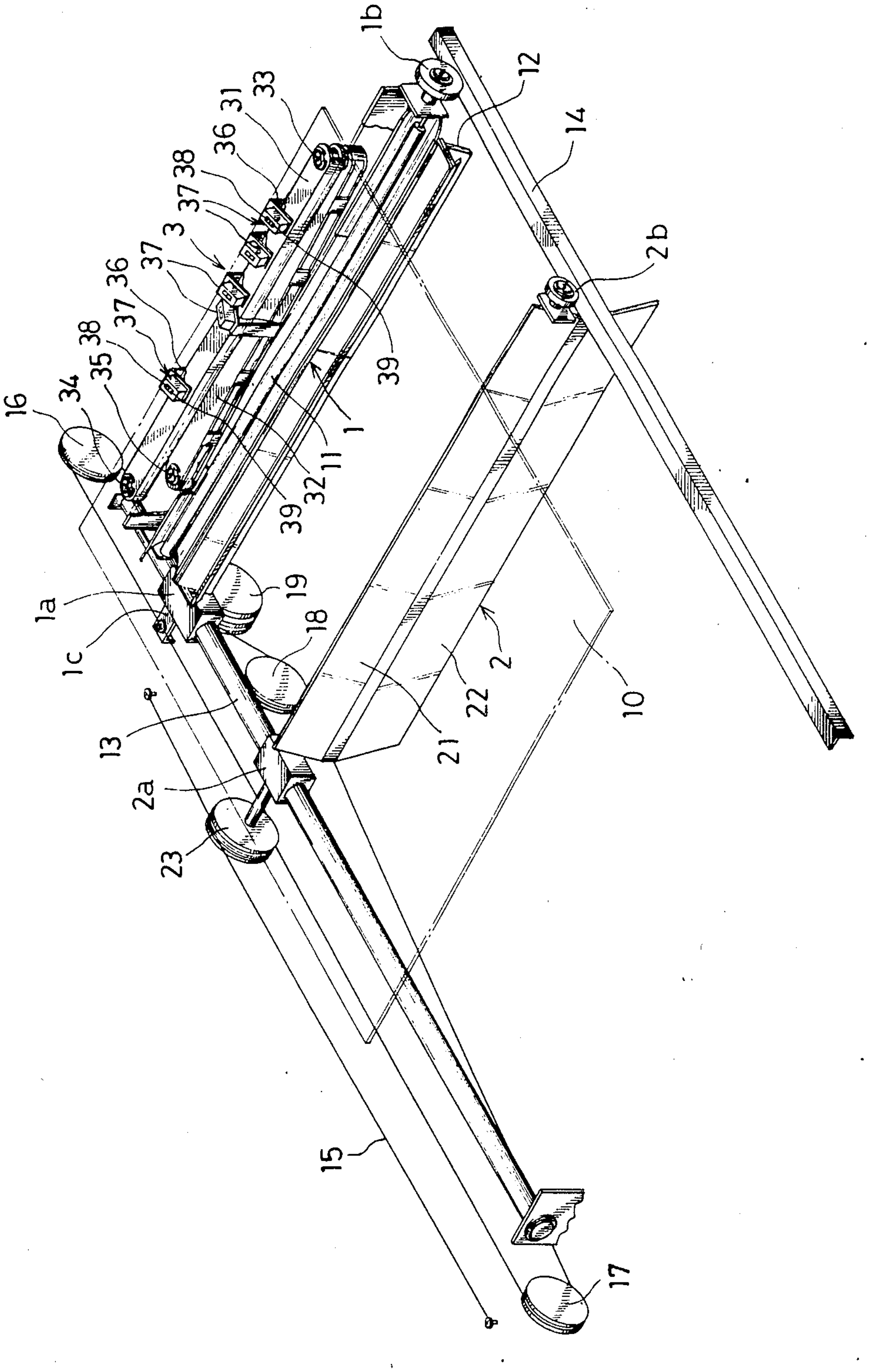
FIG. 3 is a perspective view showing a movable frame after being moved.

The arm 3 comprises a pair of rods 31 and 32 turnably connected together by a shaft 33 so that the arm 3 is foldable at the middle thereof. One rod 31 is turnably connected at its front end to the body of the device at a predetermined position thereon, e.g., adjacent the end of the guide shaft 13 by a shaft 34. The other end of the rod 31 is turnably connected to the first movable frame 1 at a predetermined position thereon by a shaft 35 (see FIG. 3). Attached to the rods 31 and 32 at predetermined positions thereon are a plurality of optical sensors 37 each of which comprises a light emitter 38 and a light receiver 39. The optical sensors 37 are installed by means of attaching members 36 so that they are directed obliquely upward. In addition, the rods 31 and 32 are formed with cavities 31*a* and 32*a*, through which lead wires 37*a* are passed to be connected to the optical sensors 37 for electrical wiring. Further, the cavities 31*a* and 32*a* also contribute to reducing the weight of the arm 3.

Figure 2:
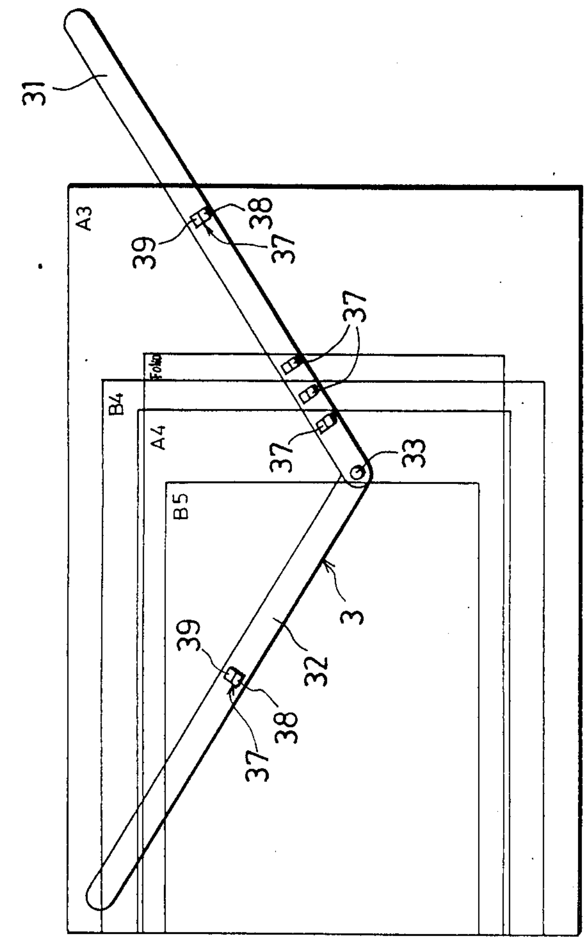
FIG. 2 is a view for explaining positions where optical sensors are installed.

Each optical sensor 37 is, as shown in FIG. 2, positioned to correspond to the set position of a document having a particular format size (such as A3, Folio, B4, A4 or B5 adopted in Japan and Europe). More particularly, the sensor 37 for detecting a document of the minimum size is positioned in a range where the document of the minimum size can be irradiated with light, while each of the other sensors 37 is positioned for irradiation with light in a region which is within a range for a document of the corresponding format size and which extends beyond a one size smaller document. Further, the optical sensors 37 are positioned close to a lower surface of a contact glass 10 which serves to set a document in position. Thus, since this arrangement does not require a high degree of directivity of the light emitter 38, there is an advantage that cost of the optical sensors 37 can be reduced.

In the arrangement thus made, wherein the first movable frame 1 is positioned in the home position as shown in FIG. 1, with the document holder (not illustrated) closed, the document size can be detected by allowing the optical sensors 37 to be operative and deciding which optical sensor 37 is that whose light receiver 39 has received a reflected light from the document.

Thereafter, the two movable frames 1 and 2 are moved, whereby the document can be exposed. In this case, since the arm 3 is folded around the axis of the shaft 33 while following the forward movement of the first movable frame 1, there is no possibility of interfering with the forward movement of the first movable frame 1.

When the movable frames 1 and 2 are moved backward, the arm 3 is contrarily unfolded, so that in this case also there is no danger of interfering with the backward movement of the first movable frame 1.

Further, since the optical sensors 37 are installed so that they are directed obliquely upward, there is no danger of them being influenced by the reflected light from the contact glass 10; thus, correct detection of the size of the document can be attained.

Figure 4:
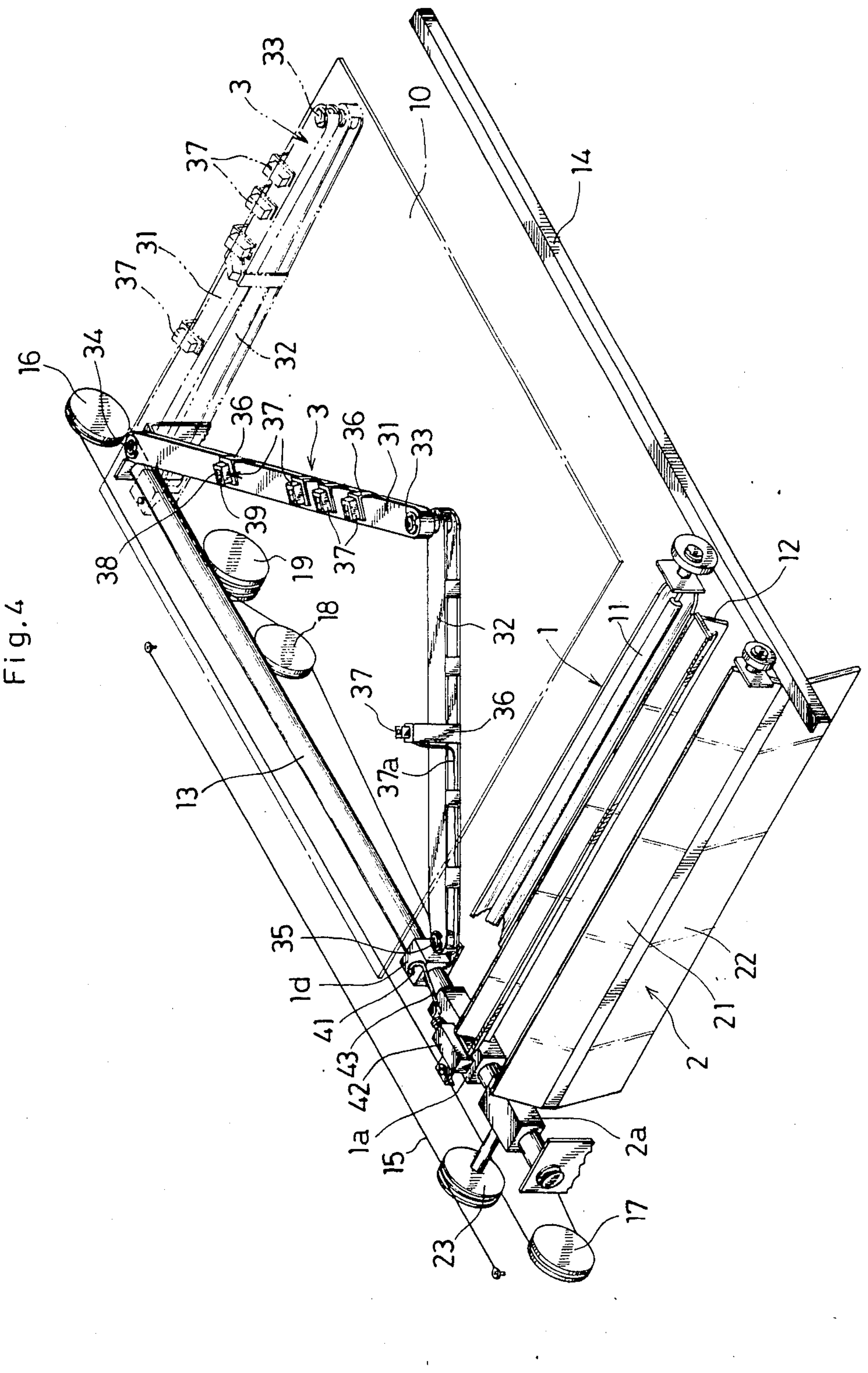
FIG. 4 is a perspective view of another embodiment of the invention.

FIG. 4 is a perspective view of an embodiment of the invention wherein the arm 3 is removably connected to the first movable frame 1. In this embodiment, the front end of the rod 32 is turnably connected to a movable member 1*d* which is movable along the guide shaft 13. An engaging pin 41 is attached to the movable member 1*d* at a predetermined position thereon. Further, an engaging hook 43 engageable with the engaging pin 41 is attached to a slide member 1*a* of the first movable frame 1. The engaging hook 43 is engaged with the engaging pin 41 by being driven for turning movement in one direction by a solenoid 42 attached to the slide member 1*a*. This engagement maintains the first movable frame 1 and the arm 3 in their interconnected state. The engaging hook 43 is disengaged from the engaging pin 41 by being driven for turning movement in the other direction by the solenoid 42. This disengagement results in canceling the interconnection between the first movable frame 1 and the arm 3. The rest of the arrangement of this embodiment is the same as in the preceding embodiment.

Therefore, in this embodiment also, as in the one shown in FIG. 1, detection of the size of documents can be made. When the first movable frame 1 is once moved forward, the solenoid 42 is actuated to cancel the engagement between the engaging hook 43 and the engaging pin 41, whereby the arm 3 can be held folded in readiness for operation. Further, after the first movable frame 1 has been moved forward a predetermined number of times, the arm 3 can be unfolded again while following the movement of the first movable frame 1 by establishing the engagement between the engaging hook 43 and the engaging pin 41. That is, the arm 3 can be folded only when it is necessary to detect the size of a document. Thus, in the case where a single document or documents of the same size are to be continuously copied, the load required for moving the optical section can be reduced. Moreover, the load-variation at the optical unit can be prevented so that a blurring is positively avoided. Another advantage is that the lead wires 37*a* for the optical sensors 37 can be prevented from being loaded.

In each of the embodiments described above, for a document of each size, there is only one point for document size detection by the optical sensor 37. As a result, in the case where there is a bold-faced character portion in a document at such a point, the light receiver 39 of the corresponding optical sensor 37 cannot receive the reflected light from the document. That is, if the document size detecting device of the aforesaid arrangement is used, there will be a case where it is decided that no document has been set, even if a document has been actually set. Such an erroneous decision can be avoided by moving the movable frames 1 and 2 a predetermined distance to fold the arm 3 after a document size detection by the optical sensors 37 has been made, and making a document size detection again with the optical sensors 37 in its moved state.

Figure 5:
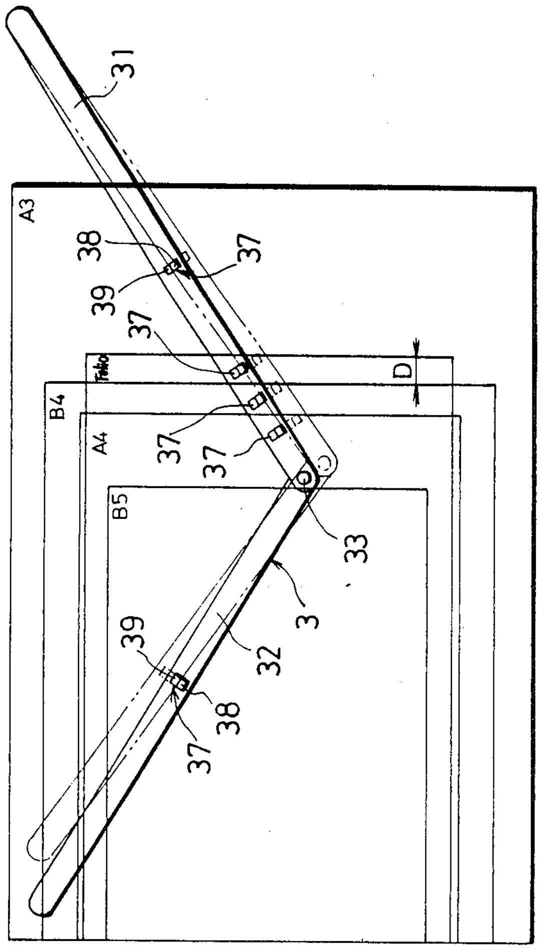
FIG. 5 is a view for explaining a case where document size detection is made twice.

In this connection, a further description will be given with reference to FIG. 5 hereinafter. First, with the first movable frame 1 positioned in the home position as shown in solid lines in FIG. 5, the optical sensors 37 are moved when the document holder (not illustrated) is being closed, and the first detection of the size of a document is made by deciding which optical sensor 37 is that whose light receiver 39 has received the reflected light from the document. Upon completion of the first detection of the document size, the movable frames 1 and 2 are moved a predetermined distance to move the optical sensors 37 a predetermined distance as shown in two-dot chain line in FIG. 5, and the second detection of the document size is made in the same manner as above.

In addition, the aforesaid first and second detections of the document size are made during the closing operation of the document holder (not illustrated); thus, there is no need to perform the closing and opening of the document holder twice.

By making two detections of the document size in such a manner, the presence of a document can be reliably ascertained even if there is a bold-faced character portion in the document at the point for document size detection by the optical sensor; thus, on the basis of this ascertainment, the document size can be correctly detected.

For deciding which of the results of the aforesaid two detections should be employed, there can be contemplated a method which comprises, subsequently to the first detection of the document size, deciding whether or not the level of detection by the optical sensors 37 has been changed, and, if it is not changed, holding the detection level, and if it is changed, deciding which of the first and the second detection levels is higher to hold the higher detection level, whereby detecting the document size on the basis of these held data. As another method of decision, there can be contemplated a method wherein the document size is detected solely on the basis of detection levels higher than a predetermined reference level.

To make twice the detections of the document size, as described above, it is necessary to inch the movable frames 1 and 2. However, this does not particularly complicate the control of the copying machine. The reason is that in copying machines, in order to ascertain that the optical section is in the home position when the power is turned on, it is necessary to move the movable frames 1 and 2 back and forth; thus, this moving mechanism can be used to move the optical sensors 37.

If the distance to be traveled by the optical sensors 37 is in a range of difference between two closest dimensions of documents among a plurality of documents of different format sizes (the range indicated by the reference character D in FIG. 5, which is, for example, about 5 mm), ordinary document size detection can be accurately made. The distance to be traveled by the movable frame 1 is therefore instituted to be in the range, for example, of about 10 mm to 50 mm. However, if the number of sizes of documents to be identified is small and if the difference between the sizes of documents is great, the distance of travel may be set at a greater value. It is, of course, also possible to provide three or more locations for document size detection.

Figure 6:
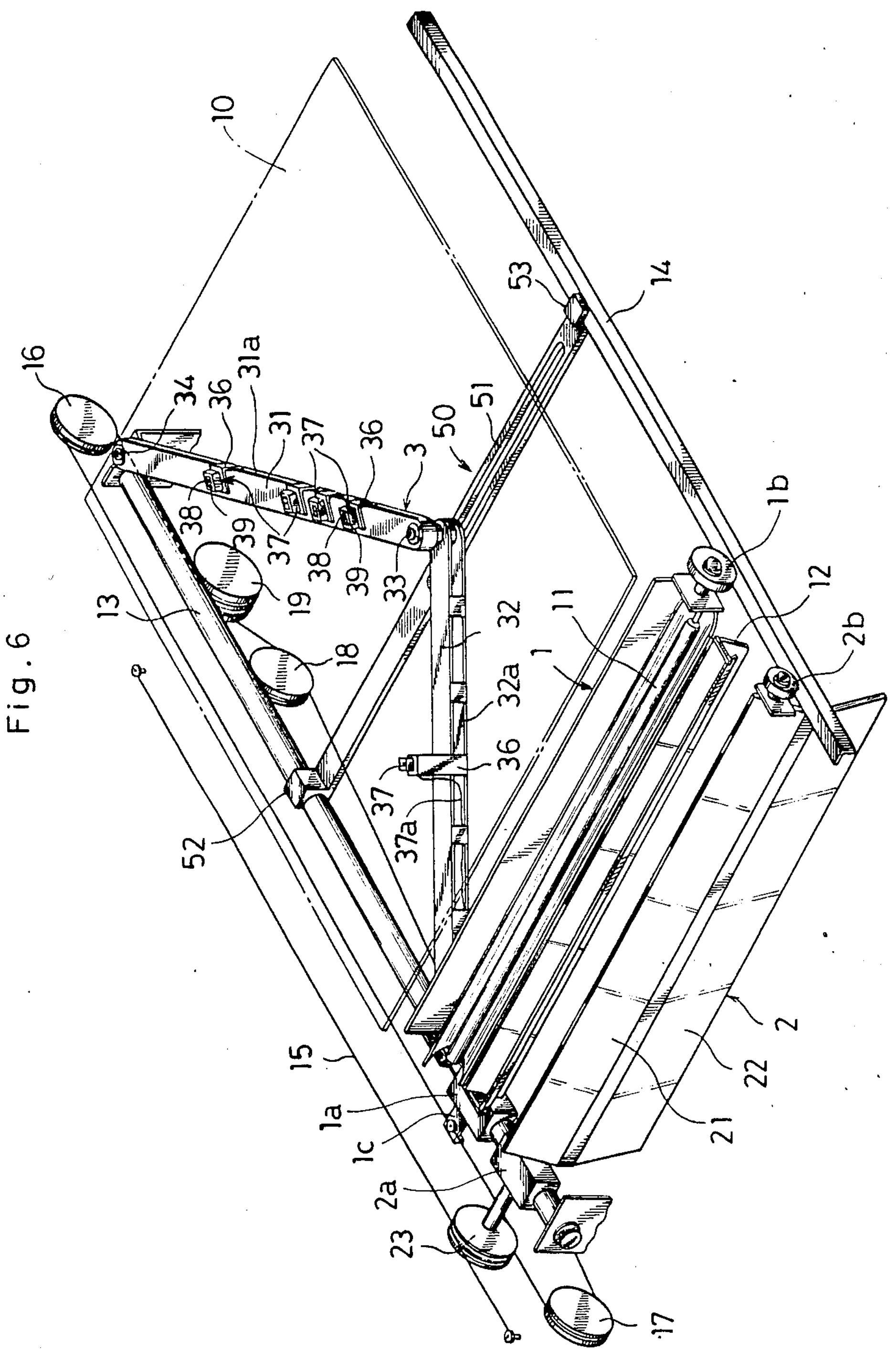
FIG. 6 is a perspective view of a further embodiment of the invention.
Figure 8:
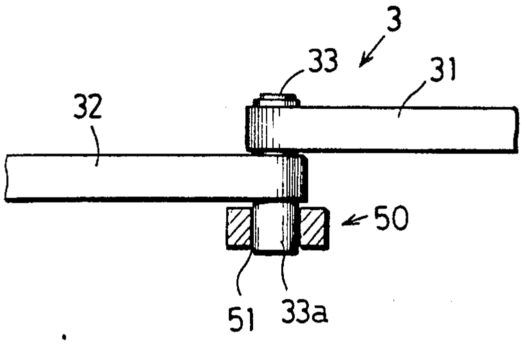
FIG. 8 is a view, partly in section, showing engagement between an arm and an arm support member.

FIG. 6 is a perspective view of a further embodiment of the invention. The arm 3 is supported at its middle foldable portion by a support member 50. The support member 50 is disposed parallel to the movable frames 1 and 2. One end 52 of the support member 50 is slidably engaged with the guide shaft 13. The other end 53 of the support member 50 is slidably supported by a guide rail 14. The shaft 33 for interconnecting the rods 31 and 32 extends downward beyond the rod 32 (see FIG. 8). The lower portion 33*a* of the shaft 33 is engaged in an elongated groove 51 formed in the support member 50. The rest of the arrangement of the embodiment is the same as in the embodiment shown in FIG. 1.

Thus, with the first movable frame 1 positioned in the home position, as shown in FIG. 6, the optical sensors 37 are actuated when the document holder (not illustrated) is being closed, and it is decided which optical sensor 37 is that whose light receiver 39 has received the reflected light from the document, whereby the document size can be detected.

Figure 7:
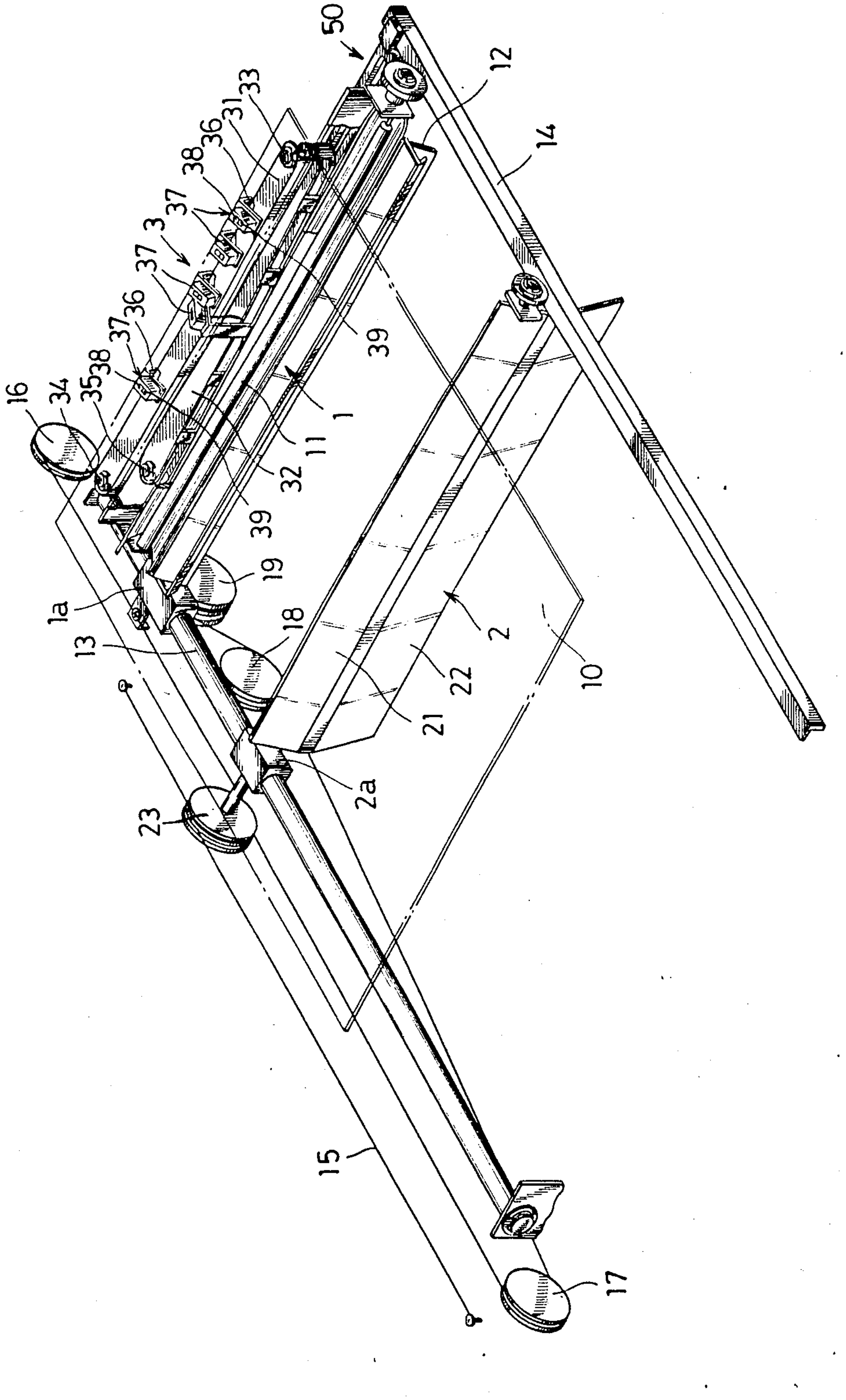
FIG. 7 is a perspective view showing a movable frame after being moved.

Thereafter, the document can be exposed by moving the movable frames 1 and 2 forward. In this case, the arm 3 is moved together with the first movable frame 1 away from the path of light for the optical section. With this movement of the arm 3, the support member 50 also is moved parallel to the optical section. After the movable frames 1 and 2 have been moved forward to the turning point (see FIG. 7), they are moved backward to the home position, as shown in FIG. 6.

In this embodiment, since the foldable portion of the arm 3 is supported by the support member 50, sag of the foldable portion can be prevented. As a result, the positioning level of the optical sensors 37 can be maintained constant all the time. Therefore, document size detection can be made always in a stabilized manner. Further, since vertical vibration of the arm 3 can be prevented by the support member 50, exposure by the optical section can be effected in a stabilized manner. As a result, the image can be prevented from being blurred. Furthermore, since the support member 50 is moved following the movement of the arm 3, it never interferes with the movement of the optical section.

Figure 9:
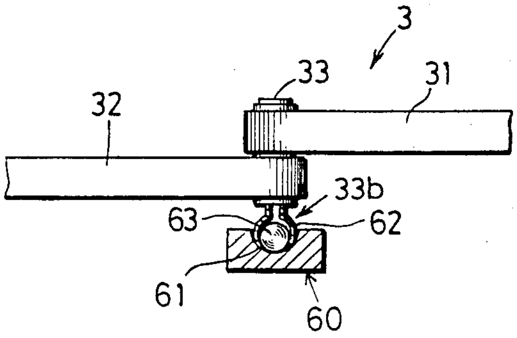
FIG. 9 is a view, partly in section, showing another type of engagement between the arm and the arm support member.

FIG. 9 shows another embodiment of the invention, which differs from the embodiment shown in FIG. 6 in the shape of the lower portion 33*b* of the shaft 33 and the shape of the elongated groove 61 in the support member 60. The rest of the arrangement is the same as in FIG. 6 and the corresponding parts are indicated by the same reference characters.

In this embodiment, the lower portion 33*b* of the shaft 33 is provided with a ball 63 rotatably held by a ball support 62. The elongated groove 61 of the support member 60 has a depth such that the ball 63 can freely roll therein but does not roll out of the groove. With the arrangement thus made, when the arm 3 is folded following the movement of the first movable frame 1, the ball 63 in the lower portion 33*b* of the shaft 33 rolls along the elongated groove 61, so that the shaft 33 can be smoothly moved along the support member 60.

Other various means for supporting the arm 3 can be mentioned than the one described above. For example, the shaft 34 and 35 may be provided with plate springs for elastically urging the arm 3 upward. In the case of a copying machine having a partition plate for separating the optical section from the lower portion of the device, the partition plate can take the place of the support means of the construction shown in FIG. 9, i.e. the lower portion 33*b* of the shaft 33 may be extended to the partition plate to allow the ball 63 to roll on the partition plate.

Figure 10:
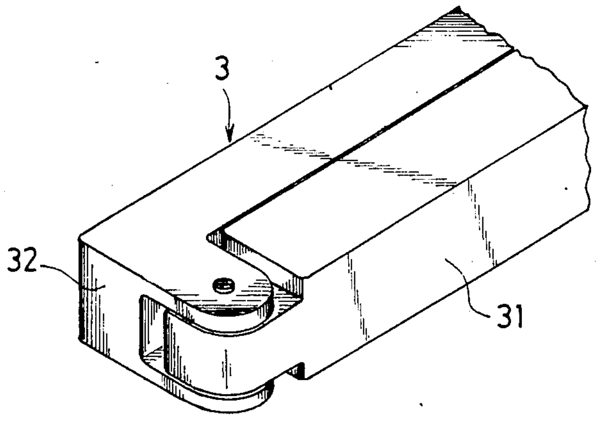
FIG. 10 is a fragmentary view showing another embodiment of an arm.

FIG. 10 is a principal perspective view showing another embodiment of the arm 3. This embodiment differs from the above embodiments in that one rod 32 is bifurcated at its end and the other rod 31 is held in the bifurcation and connected thereto. In the case of this embodiment, the upper surface of the rod 31 can be positioned on a level with the upper surface of the rod 32. Thereby, the levels at which the optical sensors 37 are attached to the arm 3 can be made the same all together. Therefore, the attaching members 36 used for the optical sensors 37 can be of the same shape, whereby the attachment and adjustment of the optical sensors 37 can be simplified.

Embodiments of the document size detecting device of the present invention have so far been described in detail, but the invention is not limited thereto. For example, it is not absolutely necessary to set the foldable portion of the arm 3 at the middle of the arm 3; the setting position of the foldable portion depends on whether the end of the arm 3 is attached to the optical section or to the copying machine body. The device of the invention can, of course, be mounted on other image processing devices than copying machines.

According to the invention in the foregoing, the document size detecting device can be easily mounted on the image forming device of the optical section moving type, without having to attach a special driving mechanism for detecting the document size. Further, the invention is not influenced by the speed at which the document holder is closed. Further, the invention is capable of reducing the time required from the time of keying for starting exposure of a document till completion of exposure of the document.

What we claim is:

1. A document size detecting device adapted to be mounted on an image forming device which exposes a document for forming an image thereon by moving an optical section, said document size detecting device comprising an arm foldable at a predetermined portion thereof, and connected at one end thereof to a body of the image forming device at a predetermined position thereon and at the other end thereof to a movable frame at a predetermined position thereof which supports the optical section, so that the arm can be folded and unfolded in operative association with the movement of the optical section, and a plurality of optical sensors attached to said arm corresponding to various format sizes of documents.

2. A document size detecting device according to claim 1, wherein said arm is removably attached to the movable frame.

3. A document size detecting device according to claim 1, wherein said optical sensors are reflecting type sensors and attached to the arm so that they are directed obliquely upward.

* * * * *